Patented Sept. 27, 1938

2,131,121

UNITED STATES PATENT OFFICE 2,131,121

PROCESS OF INCREASING THE FASTNESS OF DYEINGS

Paul Schlack, Berlin-Treptow, Germany, assignor to I. G. Farbenindustrie Aktiengesellschaft, Frankfort-on-the-Main, Germany, a corporation of Germany No Drawing. Application January 21, 1936, Serial No. 60,061. In Germany January 25, 1935

4 Claims. (Cl. 8—74)

This invention relates to a process of increasing the fastness of dyeings of acid dyestuffs upon wool, natural silk, leather, and artificial fibers which contain basic artificial resins or cellulose derivatives.

In my co-pending application Ser. No. 53,004 filed Dec. 5, 1935, I have proposed to improve the fastness of dyeings produced by acid dyestuffs on materials which contain, bound to a radical of high molecular weight, basic nitrogen-groups, by the action of an alkylating agent. It has been stated that a particularly strong effect is obtained when the treatment with the alkylating agent occurs in presence of an alkylene oxide or an analogue thereof. This effect is often, at least in the case of wool, more than additive.

It is therefore an object of the present invention to provide a new and improved process of increasing the fastness of dyeings of acid dyestuffs on the aforementioned materials. Further objects will become apparent from the detailed specification following hereinafter.

The present invention is based on the observation that very good results are obtained if instead of the previously recommended alkylating agent or mixtures thereof with alkylene oxides one uses exclusively an alkylene oxide, a derivative thereof, or an analogue thereof, or mixtures of these bodies. There may also be used compounds which, under the conditions of reaction, split up with the formation of alkylene oxide or alkylene imine or any combination of such compounds.

A particularly good result is obtained when an alkylene oxide or alkylene imine is used which carries, preferably close to the group having a tendency for the addition, an ester-group still capable of exchange, especially a halogen, so that, after the addition, it is still possible to produce an intramolecular alkylation.

It is particularly advantageous to cause the treating agent, for example, epichlorhydrin, to act in a gaseous medium. In this case all possibility of a bleeding of the dyestuff, for instance, into white or light grounds, or discharge impressions in printed articles, is avoided with certainty. For the treatment of dyed products, for example, wool, leather, acetate artificial silk which contains basic artificial resin or a basic cellulose derivative, the following compounds come into consideration: ethylene oxide, propylene oxide, butylene oxide, butadiene dioxide, epichlorhydrin, 1-chlor-2.3-propylene sulfide, diethylaminopropylene oxide, piperido-propylene-oxide-methoiodide, ethyl-beta-chlorethyl-ethylene-iminium chloride, dimethyl-$\gamma$-chlorhydroxypropyl-beta-hydroxy-trimethylene-iminium chloride, ethyl-benzylethyleneiminium chloride, dibenzylethyleneiminium chloride, the product of the action of two molecular proportions of potassium hydroxide on cyclohexyltrichlorhydroxypropylammonium chloride, the spirocyclic diquaternary ammonium chloride from dichlorhydroxypropylpiperazine or combinations of such bodies, for example, of diethylethyleneiminium chloride and epichlorhydrin. Also bodies which contain capillary active radicals or condensed nuclei, besides alkylene oxide groups, may be used, especially in the case of wool. It is possible to improve the fastness of basic dyeings by means of sodium propylene oxide sulfonate.

Since the speed of reaction and the depth to which the reaction proceeds depend on the swollen condition of the material, it is advantageous, if aqueous baths and padding solutions are not used, to work with an enhanced relative degree of saturation of moisture in the atmosphere, for example, with a relative moisture saturation of 60 to 95%. Saturated vapor may also be used if the goods treated will tolerate the condensation of the moisture.

To increase the effect, the goods may be pretreated with an agent which has a specific swelling effect or enhances the speed of the reaction, for example, formamide, acetamide, thiourea, salicylic acid, salts of phenol-sulfonic acid, sulfocyanides, sodium iodide, lithium chloride, dodecyltrimethylammonium iodide, or such agent may be added to the treating liquor or impregnating solution. The operation may also be conducted in the presence of a volatile swelling agent, for instance, a tertiary amine, such as pyridine or trimethylamine. In order to minimize or avoid yellowing and damage to the fibers, the operation may be conducted in the presence of an oxidizing or reducing bleaching agent or agent for protecting the fiber, for example, a water-soluble, hydroxyalkylated protein substance, a tertiary amino-acid, a condensation product of phenol sulfonic acid with formaldehyde or another buffer substance.

If desired, a pre-treatment with acid, for example, formic acid, lactic acid or tartaric acid, may be applied with advantage, or indeed as a necessity in the case of artificial silk, for example, which contains basic artificial resin free from acid groups, or in the case of cotton which is impregnated with such artificial resins. Even working in the presence of carbon dioxide may be useful in such cases. Not all dyestuffs will tolerate the treatment with hydroxyalkylating agents without change. However, in the majority of cases, the change in the shade and in the depth of color is not substantial. Inasmuch as the change in the dyeings increases with an increase in the pH value, it is desirable in the case of sensitive dyestuffs, for example, p-hydroxy-azo dyestuffs or dyestuffs having readily reactive aromatic amino groups to operate in a weakly acid medium, for example, in the presence of lactic acid. For example, a dyeing produced on wool by means of 3% by weight of the wool of Orange II (Schultz, Farbstofftabellen, 7th ed. Vol. I, No. 189) is hardly changed by an eight hour treatment with epichlorhydrin at 75% relative moisture saturation of the air. The same is true with respect to Alizarine Direct Blue A (Schultz, Farbstofftabellen, 7th ed., suppl. vol., page 62). Azofuchsine G and Orange I (Schultz, Farbstofftabellen, 7th ed. Vol. I, No. 190 and No. 185, respectively) on the other hand, are changed in shade under the same conditions. In the presence of weak acids the change in the dyeings prepared from Orange I can be avoided. It may be stated that the fastness of the dyeings may be still further improved by after-steaming, if desired in the presence of some acid.

The following examples illustrate the invention:

Example 1.—100 grams of wool, dyed with 3 per cent of Alizarine Direct Blue A, are treated for 8 hours, while subjecting to rhythmical oscillations of pressure of about 60–100 mm. of water column, with 15 parts of epichlorhydrin in 10 liters of air of a relative humidity of 90 per cent and the fastness to washing of the dyeing is quite considerably increased. White goods subjected to a soap wash as prescribed by the Rules of the Fastness Commission of the Verein Deutscher Chemiker, 5th report, 1931, are practically unsoiled and the soap-bath is colored only feebly. On the other hand, the untreated dyeing bleeds strongly and white goods are somewhat highly dyed. An analogous result is obtained with a dyeing of Alizarine Cyanine Green G.

Example 2.—Instead of epichlorhydrin used in Example 1 a corresponding quantity of propylene oxide is used. In this case also the improvement in fastness, particularly in fastness to water, is considerable, although not so thorough.

Example 3.—Wool dyed with Orange II is impregnated with a solution of 5 per cent strength of the diquaternary trimethylene-iminium salt of dichlorhydroxypropylpiperazine. The slightly dried material is rolled up and heated for 14 hours in air of 75 per cent relative humidity at 80° C. A considerable improvement of fastness to washing is obtained.

Example 4.—Wool which has been dyed in formic acid solution with 3 per cent of Amidonaphthol Red BB (Schultz Farbstofftabellen, 7th edition, Vol. I, page 58) is treated with 12 per cent of epichlorhydrin for 10 hours in a vessel of 25 parts of volume containing an atmosphere with 92 per cent of relative humidity heated at 50° C. The practically unchanged dyeing has become completely fast to water and is scarcely weakened when washing with soap and soda at 80° according to the prescriptions of the "Fastness Commission." White material is not soiled. Similar strong improvements are obtained when dyeing in an acid medium with the following dyes:

Flavazin S (Schultz Farbst. Tab. 7th ed. Vol. I No. 735)
Victoria Scarlet 3 R (Schultz Farbst. Tab. 7th ed. suppl. vol. p. 143)
Radio Red VB (Schultz Farbst. Tab. 7th ed. suppl. vol. p. 122)
Supranol Brilliant Red 3 B (Schultz Farbst. Tab. 7th ed. suppl. vol. p. 136)
Azo Wool Violet 7 R (Schultz Farbst. Tab. 7th ed. suppl. vol. p. 70)
Sulfonic Acid Blue R (Schultz Farbst. Tab. 7th ed. Vol. I No. 247)
Amido Blue GGR (Schultz Farbst. Tab. 7th ed. suppl. vol. p. 65)
Naphthazine Green V (Schultz Farbst. Tab. 7th ed. Vol. I No. 777).

Example 5.—Wool-felt dyed with 3 per cent of Anthralane Red G (Schultz Farbst. Tab. 7th ed. suppl. vol. p. 68) is heated for 15 hours at 50° with 20 per cent of epichlorhydrin in a vessel of 50 parts by volume containing an atmosphere of 75 per cent of relative humidity. The treated felt shows now a very good fastness to water. Also when washing with soap and soda at 50° C. according to the prescriptions of the "Fastness Commission" the dyeing and white material washed together with the dyed felt remain unchanged. The non-after-treated felt bleeds strongly into the bath and soils white wool considerably.

Also a 9 per cent dyeing with the same dyestuff on hair-felt is considerably improved by this treatment. The coloring becomes practically fast to water and behaves in soaping at 50° similar to the weaker dyeing on wool-felt.

Example 6.—Zephir yarn which is dyed to a deep shade of Bordeau by 0.5 per cent of Palatine Fast Blue RRN (Schultz Farbst. Tab. 7th ed. suppl. vol. page 116)
5 per cent of Palatine Fast Bordeau BN (Schultz Farbst. Tab. 7th ed. suppl. vol. page 117)
2 per cent of Palatine Fast Rose BN (Schultz Farbst. Tab. 7th ed. suppl. vol. page 118)
2.5 per cent of Palatine Fast Orange GEN (Schultz Farbst. Tab. 7th ed. suppl. vol. page 118)

is heated at 60° for 15 hours with 20 per cent of epichlorhydrin at 90 per cent of relative humidity. The dyeing is now fast to water, whereas before the treatment white material is rather strongly soiled.

Example 7.—A woollen sheet which is dyed with 7 per cent of Amido Black A2G (Schultz Farbst. Tab. 7th ed. suppl. vol. page 66) is heated for 15 hours at 50° with 15 per cent of epichlorhydrin in a vessel of 25 parts of volume containing an atmosphere of 90 per cent of relative humidity. The fastness to water and sweat is considerably improved.

Example 8.—Wool dyed with Amido Naphthol Red BB is impregnated with a 10 per cent solution of thiourea and is treated with a mixture of 10 per cent of propyleneoxide and 10 per cent of epichlorhydrin for 12 hours at 55° C. The fastness of the dyeing is considerably improved. A similar result is obtained when using a mixture of 1.2-propylene sulfide and epichlorhydrin. The interaction may also be performed in two stages.

Example 9.—Wool dyed with Amido Naphthol Red BB in the presence of sulfuric acid and washed with a diluted solution of sodium acetate is heated with 15 per cent of butadiene dioxide for 14 hours at 50° C. in a closed vessel of 25 parts of volume. The fastness of the dyeing to water and washing is considerably improved.

What I claim is:

1. A process of increasing the fastness of dyeings of acid dyestuffs upon wool, natural silk, leather, artificial fibers which contain basic artificial resin, artificial fibers which contain basic cellulose derivatives, which comprises alkylating the dyed material with a compound selected from the group consisting of alkylene oxides, alkylene imines, alkylene sulfides and quaternary alkylene imines.

2. A process of increasing the fastness of dyeings of acid dyestuffs upon wool, natural silk, leather, artificial fibers which contain basic artificial resin, artificial fibers which contain basic cellulose derivatives, which comprises alkylating the dyed material with an evaporated alkylene oxide in an atmosphere of high relative moisture.

3. A process of increasing the fastness of dyeings of acid dyestuffs upon wool, natural silk, leather, artificial fibers which contain basic artificial resin, artificial fibers which contain basic cellulose derivatives, which comprises alkylating the dyed material with a compound selected from the group consisting of alkylene oxides, alkylene imines, alkylene sulfides and quaternary alkylene imines in the presence of a buffer substance.

4. A process of increasing the fastness of dyeings of acid dyestuffs upon wool, natural silk, leather, artificial fibers which contain basic artificial resin, artificial fibers which contain basic cellulose derivatives, which comprises alkylating the dyed material with epichlorhydrin.

PAUL SCHLACK.